UNITED STATES PATENT OFFICE.

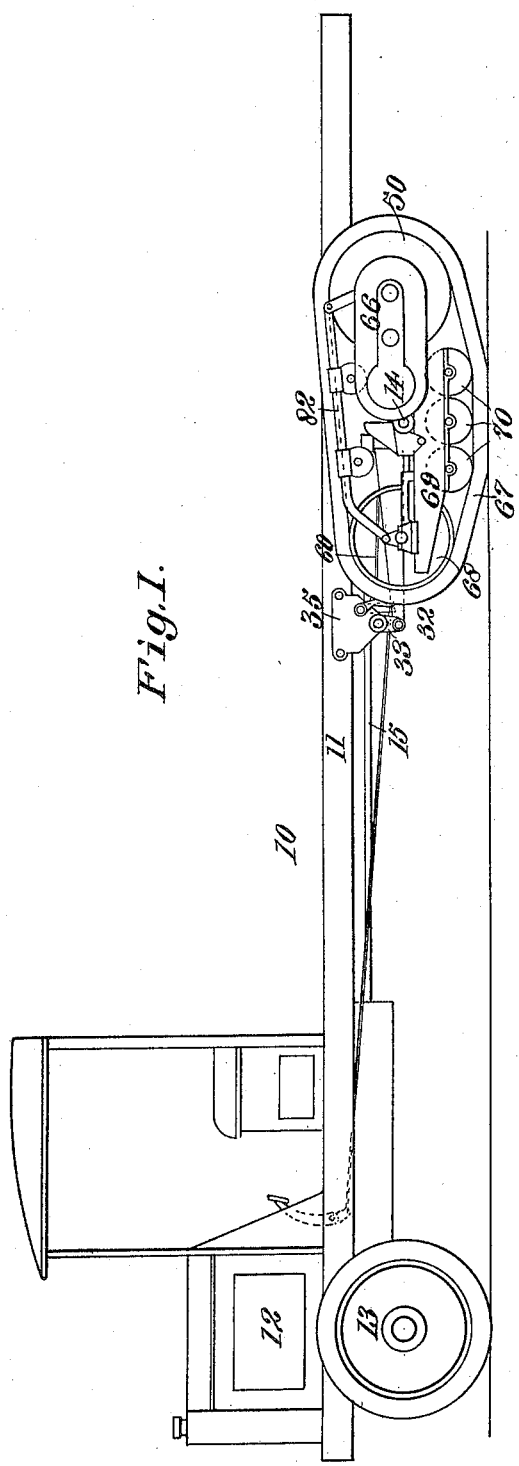

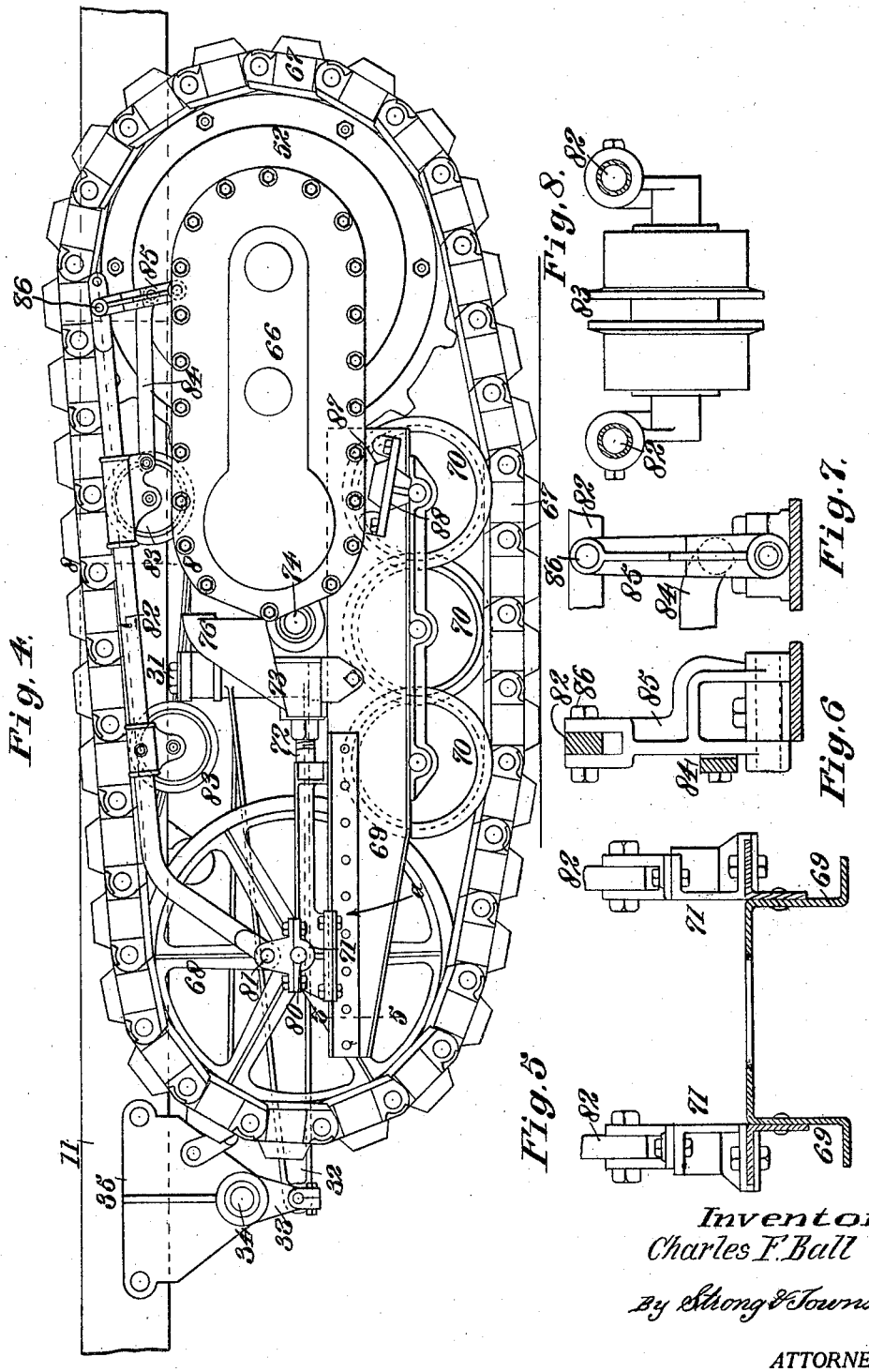

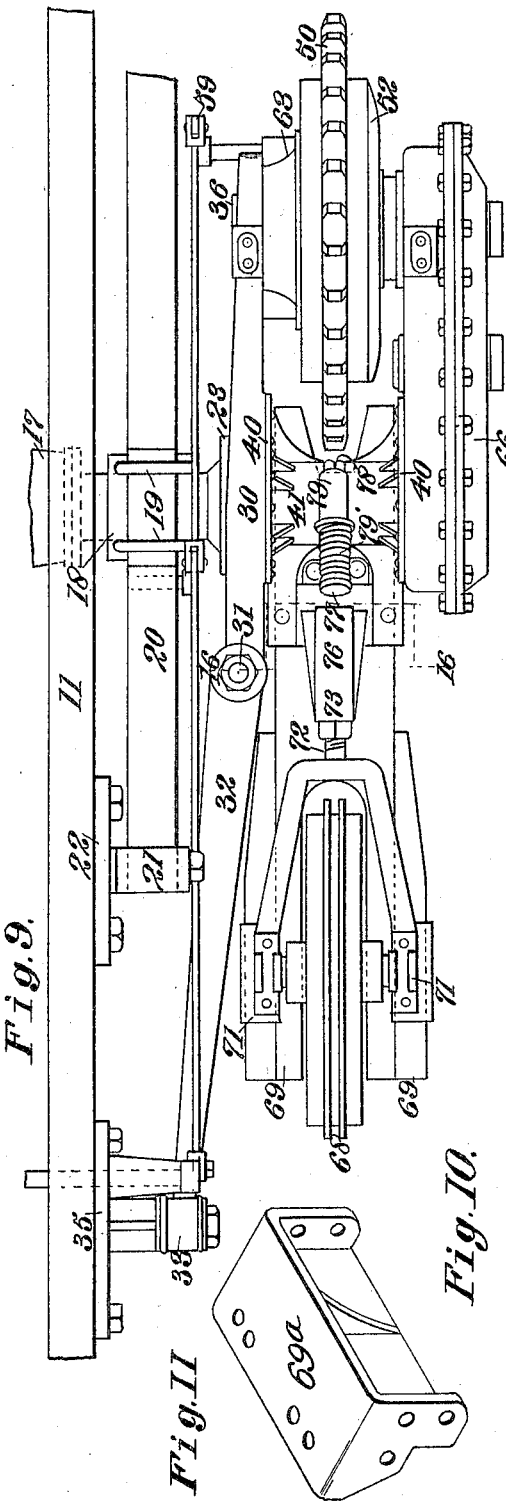

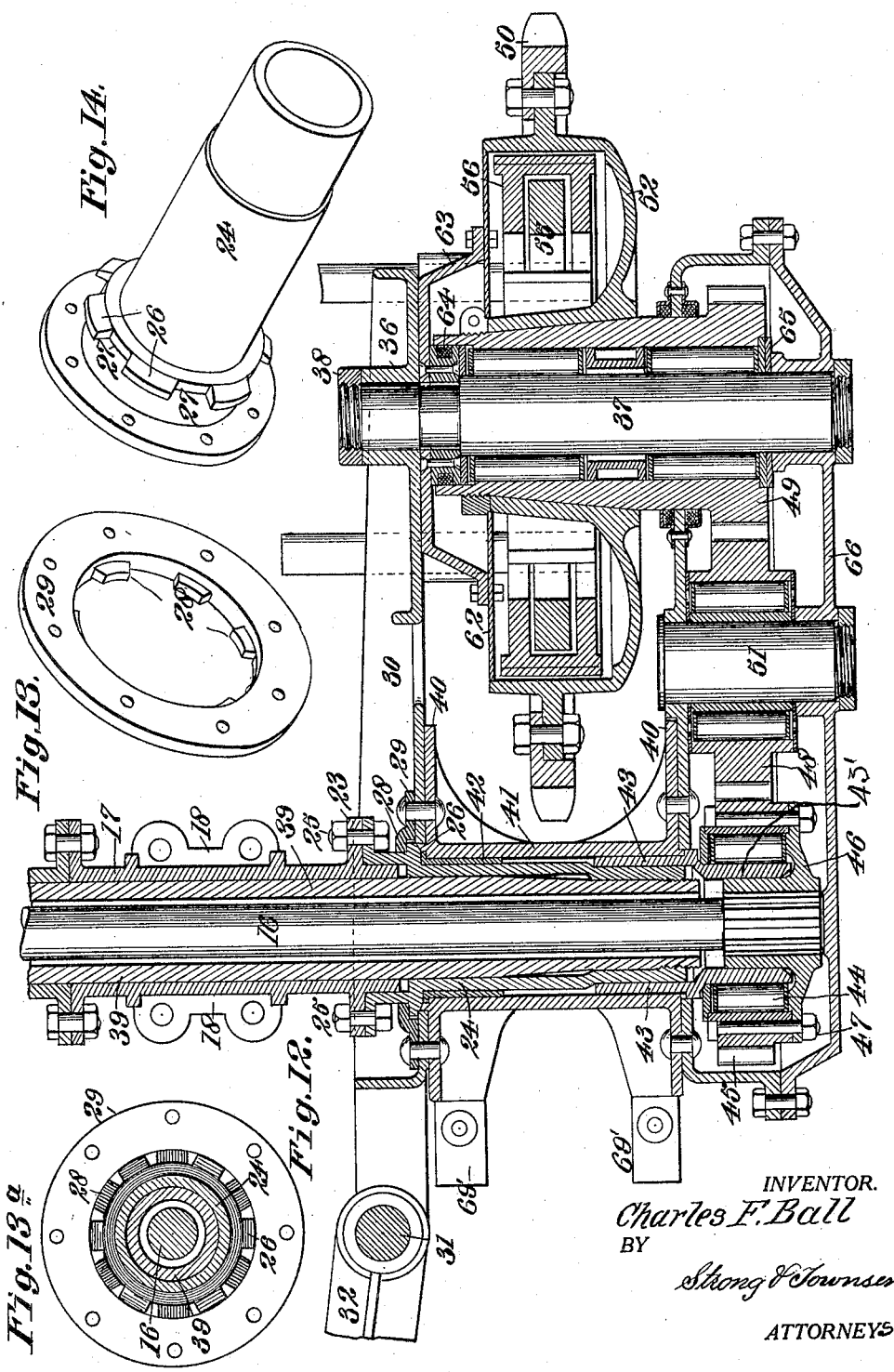

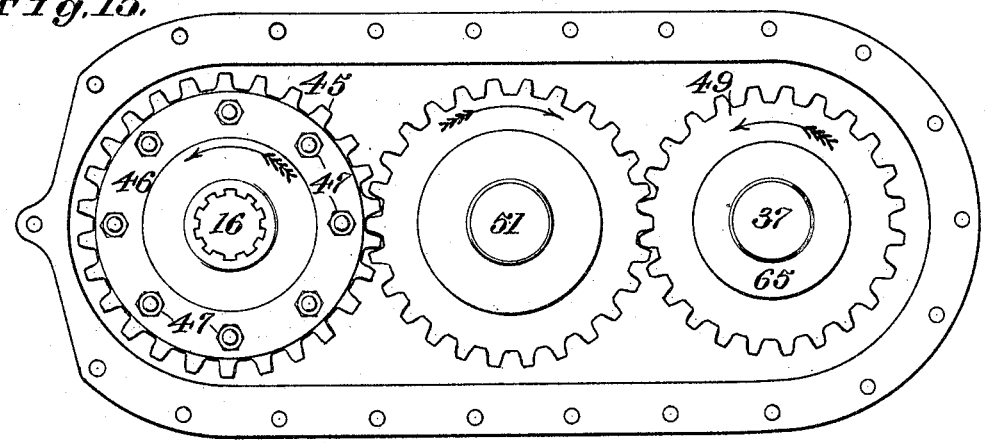

CHARLES F. BALL, OF PEORIA, ILLINOIS, ASSIGNOR TO THE HOLT MANUFACTURING COMPANY, OF STOCKTON, CALIFORNIA, A CORPORATION OF CALIFORNIA.

AUTO-TRACTOR.

1,387,033.  Specification of Letters Patent.  Patented Aug. 9, 1921.

Application filed September 11, 1918. Serial No. 253,644.

*To all whom it may concern:*

Be it known that I, CHARLES F. BALL, a citizen of the United States, residing at Peoria, in the county of Peoria and State of Illinois, have invented new and useful Improvements in Auto-Tractors, of which the following is a specification.

This invention relates to auto tractors of the type shown and described in Patent No. 1,314,651, to P. E. Holt, dated September 2, 1919, wherein a self-laying track mechanism is substituted for the usual round wheel in a motor vehicle.

The object of this invention is to simplify and improve the construction and operation of a device of this class, and especially to facilitate the mounting of the traction unit in place on a floating type of rear axle, and further to adapt a track laying unit to such a type of axle without imposing severe strains or thrusts upon the live axle.

One form which my invention may assume is exemplified in the following description and illustrated in the accompanying drawings, in which—

Figure 1 is a diagrammatical view in side elevation illustrating a complete motor vehicle fitted with the traction units, with which the present invention is concerned, Figs. 2 and 3 are views indicating the brake operating structures of different motor trucks of common manufacture, Fig. 4 is an enlarged section in side elevation illustrating one of the complete truck units, Fig. 5 is a transverse section through one of the track roller frames of the truck, Figs. 6 and 7 are fragmentary views in elevation illustrating a connecting member used with the chain roller supports, Fig. 8 is a view illustrating one set of the chain supporting rollers, Fig. 9 is a view in plan disclosing the assembled tractor unit and its connection with the vehicle frame, Fig. 10 is a view in side elevation similar to Fig. 4 illustrating the truck with the gear case and chain track removed.

Fig. 11 is a perspective view disclosing one of the bolster blocks in the truck.

Fig. 12 is an enlarged fragmentary view in section and plan illustrating the manner in which the truck unit is attached to the axle housing, and further disclosing the final drive for the unit, Figs. 13 and 14 are views in perspective disclosing complementary parts of the axle housing extension, Fig. 13ª illustrates a detail in section, Fig. 15 is an enlarged view illustrating the driving gears transmitting power from the vehicle axle to the driving axle of the truck unit, Fig. 16 is a view in transverse section as seen on line 16—16 of Fig. 9, Fig. 17 is a view in side elevation illustrating the pivotal connection between the track roller truck and the transmission housing, Figs. 18 and 19 are views in plan and end elevation, respectively, illustrating the members shown in Fig.17, Fig. 20 is a view in vertical section and elevation showing the radius rod connection to the truck unit.

In the drawings, 10 indicates a motor vehicle here shown as a truck of conventional design having a frame 11 and power plant 12, and front and rear axles 13 and 14 respectively. Power is transmitted from the power plant to the rear axle by means of propeller shaft 15. This shaft is adapted to drive a transversely extending live axle 16, which is normally inclosed within a tubular axle housing 17.

It is to be understood that the mechanism with which the present invention is involved may be applied to trucks of various design, although the construction of the vehicles here shown possesses certain immaterial features which may be altered in other vehicle designs. The axle housing 17 in the present instance is provided with spring seats 18 adapted to be properly secured by U-bolts 19 to platform springs 20. One of these springs is mounted upon each side of the frame and there secured by spring shackles 21 pivotally mounted to spring brackets 22, which are fixed to the sides of the frame. The outer ends of the axle housing are formed with flanges 23 which serve normally to connect the brake-bands in place. A bushing 39 forming also a part of the axle housing extends outwardly and serves as a support for the wheel.

Each track laying unit includes a transmission frame structure 30 formed with a hub 41 to fit over the axle housing in the place usually occupied by the round wheel. The manner of connecting the transmission frame structure in place on the axle housing is novel and advantageous and contemplates the use of a sleeve 24 fitted over the end of the axle housing and provided with a flange at its inner end to connect with the flange 23 on said housing. Spaced a slight distance from the inner end of the sleeve is a row of peripheral lugs 26 with intermediate spaces 27. The hub 41 with the transmission frame connected thereto is then pressed in place over the sleeve 24, preferably using an inside bushing 42 and an outside bushing 43 to secure a proper fit between the hub and sleeve. On the inner end of the hub is a locking ring 29 with annular lugs 28 projecting into the transverse plane of the lugs 26, but proportioned and positioned so that when the hub 41 is turned angularly out of its normal position the said lugs 28 will pass through the spaces 27 to the rear thereof. When the hub is returned to normal position the lugs 28 will lie behind the lugs 26 and thus serve to lock the hub against removal from the axle housing. The hub is held against turning movement on the sleeve by means of a radius rod 32 connected to the transmission frame structure by a vertical pin 31. This rod 32 extends forwardly and is pivotally connected to a shackle 33, the shackle in turn being carried upon a pin 34 by a radius rod bracket 35.

The frame structure 30 extends rearwardly in divided fashion and at its rear ends receives an axle 37 which supports a chain driving sprocket wheel 50. The sprocket wheel is driven by a train of gears 45, 48 and 49 from the live axle 16, said gears being carried at the outer side of the transmission frame structure and inclosed by a cover plate 66.

The hub 41 has forwardly and downwardly extending arms 69' to which is connected by a pivot 74 a roller truck frame 69. This truck frame has journaled upon it load carrying rollers 70 for operation on the ground stretch of an endless track 67, and at the forward end of said roller truck frame is an idler sprocket wheel 68 to guide said track.

By means of the pivotal connection 74 the roller frame is free to rock in a vertical plane and thus to conform more or less to irregularities in the surface of the road. To limit the extent of upward movement of the forward end of the roller frame I arrange an upstanding bracket 76 on the roller frame overlying the pivot 74, and this bracket coöperates at its upper end with a compressible helical spring 79' carried on a plunger 77, which latter fits slidably in a bearing 79 formed on the hub 41.

Another feature of some importance in overcoming excessive strains on the live axle 16 is the provision of an extension 43' on the bushing 43 to lie between the hub and rim of the driving gear 45. This gear 45 has its hub connected to the end of the live axle to receive driving motion therefrom, but in order to relieve said axle of the strains and twists incident to the operation of the traction unit I interpose roller bearings 44 between the extension 43' and the rim of said driving gear 45, as best shown in Fig. 12.

I have also fitted the driving sprocket wheel with a brake mechanism comprising a drum 52 coöperating with which are two sets of shoes 54 and 55. These shoes are adapted to be separately or simultaneously expanded by means of rotatable cams 56 and 57, which cams are operated by connections 58, 59, 60 and 61 extending to the usual brake levers at the forward end of the vehicle, as illustrated in the diagram of Figs. 2 and 3.

The operation of the structure will be understood from what has already been said. Among the advantages of this construction are the ease and facility with which the track laying unit may be mounted in place on a floating type of axle and the manner in which the same is held in place thereon so as to impose no strains or twists upon the live axle. This is accomplished by means of the sleeve 24 and its interlocking connections with the hub 41. Of importance also is the manner in which the driving gear 45 is supported on the extension 43' and the provision of a housing for the train of driving gears.

Another feature of importance is the rocking movement which the roller truck frame is allowed by reason of the pivotal connection 74 including the employment of spring mechanism to yieldingly resist excessive upward movements of the forward end of the roller truck frame.

Various changes in the construction and arrangement of the several parts herein shown and described may be employed without departing from the spirit of my invention as disclosed in the appended claims.

Having thus described my invention, what I claim and desire to secure by Letters Patent is:—

1. In combination with a motor vehicle having a floating rear axle, the housing of which is provided near its ends with flanges normally serving to connect brake-bands in place, a sleeve arranged to fit over the end of the axle housing when the wheel is removed and to connect with said flange, a self-laying track mechanism having a hub portion to fit over said sleeve, means carried by the sleeve and hub to interlock when the parts are turned angularly and means to prevent angular movement of the hub on the sleeve when the parts are assembled.

2. In combination with a motor vehicle having a floating axle, the housing of which is arranged to support the wheels at its ends, being formed near each end with a flange to connect the brake-bands in place, a sleeve arranged to fit over the end of the axle housing when the wheel is removed and adapted to be connected with said flange, said sleeve being provided with peripheral locking lugs, a self-laying track mechanism having a hub portion to fit over the sleeve and formed with annular locking lugs adapted to pass between the peripheral lugs on the sleeve when the hub is turned angularly from the position normally occupied by it, said lugs being interlocked when the hub is returned to normal position, and means to prevent turning movement of the hub upon the axle housing such as to unlock said lugs.

3. In an auto tractor the combination with the usual floating axle, of a self-laying track truck mechanism having a hub portion surrounding the outer end of the axle housing and having a track driving sprocket wheel operatively connected with the live axle, means for securing the truck mechanism in place comprising a locking ring on the hub portion and a sleeve fitting between the hub and axle housing and adapted to be secured to the latter, and means on the sleeve to interlock with said locking ring by turning of the parts relatively.

4. In an auto tractor the combination with the usual floating type of rear axle, of a self-laying track mechanism having a hub portion surrounding the outer end of the axle housing and having a track driving sprocket wheel operatively connected with the live axle, means for securing the track mechanism in place comprising a locking ring on the inner end of the hub formed with annular lugs, and a sleeve fitting over the axle housing and secured thereto, said sleeve being formed with peripheral lugs adapted to lock with the annular lugs on the locking ring when the parts are turned relatively, and means for preventing turning movement of the hub on the axle housing such as would permit unlocking of said lugs.

5. In an auto tractor the combination with the usual floating axle, of a self-laying track mechanism having a hub portion surrounding the outer end of the axle housing, a driving gear on the live axle, a bushing fitted between the hub and axle housing and having an extension lying between the hub of the driving gear and the rim thereof, and antifriction devices interposed between the said extension and rim of the driving wheel for supporting the latter.

6. A self-laying chain track unit adapted to be detachably mounted in driving relation to the axle of a motor vehicle comprising a transmission frame structure supported upon the housing of said axle and carrying at its rear end a driving sprocket wheel operatively connected with said axle, and a roller truck frame pivotally connected to said transmission frame structure forwardly of the axle and spring means interposed between the roller frame and transmission frame structure for resisting excessive upward movement of the forward end of the truck frame.

7. A self-laying chain track unit adapted to be detachably mounted in driving relation to the axle of a motor vehicle comprising a transmission frame structure supported upon the housing of the axle and formed with a rearward extension, a driving sprocket wheel carried by said rearward extension and operatively connected with the axle, a roller truck frame pivotally connected to said transmission frame structure forwardly of the axle, a bracket on said roller truck frame and spring means on the transmission frame structure coöperating with said bracket to resist excessive upward movement of the forward end of the roller truck frame.

8. A self-laying chain track unit adapted to be detachably mounted in driving relation with the axle of a motor vehicle comprising a transmission frame structure supported upon the housing of the axle and formed with a rearward extension, a track driving sprocket wheel journaled on said extension, a train of gears operatively connecting said track driving sprocket wheel with said axle, said gears being carried at the outer side of the transmission frame structure, and a housing inclosing said gears.

9. A self-laying track unit adapted to be positioned in driving relation to the live axle of a motor vehicle, a tubular bearing rotatably disposed around the outer end of the axle housing, parallel frame members fixed to the opposite ends of said bearings and extending rearwardly therefrom, a sprocket spindle fixedly supported at the outer ends of said frame members for arcuate movement in relation to the axle, a driving sleeve carried upon said spindle, constantly meshing driving gears transmitting power from the axle thereto, brake drums fixed upon the sleeve, a chain track driving sprocket bolted therearound, and friction brake means for engaging the drums to retard their movement.

In testimony whereof I have hereunto set my hand in the presence of two subscribing witnesses.

CHARLES F. BALL.

Witnesses:
 H. B. BAKER,
 A. O'HARA.